United States Patent [19]

Kudo et al.

[11] Patent Number: 4,955,525
[45] Date of Patent: * Sep. 11, 1990

[54] HEAT EXCHANGER AND METHOD OF PRODUCING SAME

[75] Inventors: Hajime Kudo; Masami Asano, both of Susonoshi; Ken Toma, Mishimashi; Yo Takeuchi, Susonoshi, all of Japan

[73] Assignee: Mitsubishi Aluminum Co., Ltd., Tokyo, Japan

[*] Notice: The portion of the term of this patent subsequent to Jul. 27, 2006 has been disclaimed.

[21] Appl. No.: 316,223

[22] Filed: Feb. 27, 1989

Related U.S. Application Data

[62] Division of Ser. No. 34,835, Apr. 6, 1987, Pat. No. 4,842,185.

[30] Foreign Application Priority Data

Apr. 25, 1986 [JP] Japan .................. 61-94637

[51] Int. Cl.$^5$ ............................................. F28F 19/02
[52] U.S. Cl. .................................... 228/183; 165/133; 165/153; 165/134.1
[58] Field of Search ............... 165/133, 134.1, 153; 228/183, 263.17, 224

[56] References Cited

U.S. PATENT DOCUMENTS

| 2,508,501 | 5/1950 | Di Giulio | 148/24 |
| 2,867,037 | 1/1959 | Lawton | 148/26 X |
| 4,560,625 | 12/1985 | Kaifu et al. | 228/263.17 X |
| 4,645,119 | 2/1987 | Haramaki et al. | 228/183 |

FOREIGN PATENT DOCUMENTS

| 1221280 | 5/1987 | Canada | 165/133 |
| 96049 | 8/1981 | Japan | 228/183 |
| 160861 | 12/1981 | Japan | 228/263.17 |
| 22870 | 2/1982 | Japan | 228/183 |
| 57-56679 | 12/1982 | Japan | 165/133 |
| 215266 | 12/1984 | Japan | 228/183 |
| 229280 | 12/1984 | Japan | 228/183 |

Primary Examiner—Kenneth J. Ramsey
Attorney, Agent, or Firm—Wyatt, Gerber, Burke and Badie

[57] ABSTRACT

A method of producing a heat exchanger comprising abutting a tube made of an aluminum material and fins made of an aluminum material, applying to the resulting abutments a flux containing zinc halide, and thereafter conducting a reaction soldering in an inert gas atmosphere. The assembled tube and fins applied with the flux may be moved in a position to enhance the formation of zinc deposited by the reaction soldering during the drying step of the flux. The heat exchanger produced by this method has a thick and uniform Zn coating at the joints with good mechanical strength and surface conditions.

17 Claims, 1 Drawing Sheet

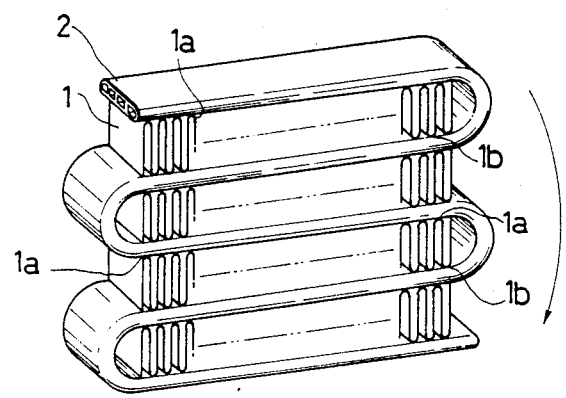

HEAT EXCHANGER AND METHOD OF PRODUCING SAME

This is a division of application Ser. No. 034,835 filed on Apr. 6, 1987, now U.S. Pat. No. 4,842,185.

BACKGROUND OF THE INVENTION

The present invention relates to a heat exchanger assembled with zinc deposited thereon by using a flux containing zinc halide and zinc powder, and a method of producing the same.

Aluminum and aluminum alloys hereinafter referred to as "aluminum materials" are widely used for heat exchangers for automobiles, aircrafts and ships and other machines and facilities, because of their lightness, workability, corrosion resistance and low expense.

The assembling of heat exchangers using aluminum materials is carried out mainly by using Al-Si filler in a vacuum without using fluxes.

On the other hand, the assembly of heat exchangers is also known to be carried out by soldering using a flux containing zinc chloride in the atmosphere to utilize zinc deposited therefrom as solder. This reaction soldering method is advantageous in that:

(1) It is not necessary to use a brazing sheet clad with filler.

(2) Since the temperature in reaction soldering is as low as about 350-500° C., the aluminum material is not deteriorated.

(3) Since the aluminum material is covered with zinc deposited on the surface thereof after the reaction soldering, high corrosion resistance is achieved That is, since Zn used for soldering is electrochemically less nobel than Al, it serves to improve the corrosion resistance of a tube when used in practical applications.

Because of the above advantages, the reaction soldering method of aluminum materials using a flux containing zinc chloride in the atmosphere has been used in part for assembling heat exchangers.

However, this reaction soldering method has its own problems:

(1) Since a large volume of flux containing a high concentration of zinc chloride is used, a large amount of $AlCl_3$ gas is generated during the reaction soldering, extremely deteriorating the working environment.

(2) A residue such as a remaining flux should be removed after the reaction soldering, but this residue can be removed only with water washing, so that the removal of the residue is difficult.

(3) Since the flux may not be fully reacted or may not spread evenly, zinc is not deposited evenly on the surface of the aluminum material, so that it does not have a good surface condition, and the improvement of corrosion resistance cannot be expected all over the surface of the aluminum material.

As a matter of fact, the above-described reaction soldering method using a flux containing zinc chloride was proposed by Clyde S. Simpelaar et al. in 1965 (U.S. Pat. 3301688) and was used in the past. This reaction soldering method, however, suffers from the generation of a large amount of $AlCl_3$ gas, so it has been fading out since about 1970.

That is, because of the generation of $AlCl_3$ gas, it may be said that the reaction soldering method using a flux containing zinc chloride is not used at present. Instead of this reaction soldering method, a vacuum brazing method and an inert gas brazing method which do not suffer from the problem of $AlCl_3$ gas generation are now being used.

The vacuum brazing method proposed by General Electric between 1967 and 1969 (U.S. Pat. No. 3321828, 3322517, 3373482, 3328914 and 3400918) and the inert atmosphere brazing method proposed by V.A.W during 1971-1972 (West German Laid-Open Patent Applications 1962760 (1971), 2129460 (1972)) have received much attention as means for providing large amounts of brazed products with little pollution, developing wider applications.

These brazing methods, however, use Al-Si filler, and the brazing temperature is as high as 600° C. Therefore, products being brazed may partially buckle during the brazing operation, and the brazed products may have decreased mechanical strength. Further, in the vacuum brazing method, it is known that Zn contained in the material for enhancing its corrosion resistance is evaporated during the brazing. Accordingly, the reaction soldering method, which can be carried out at a temperature as low as 400-450° C. without such problems, has been being used, though not widely, for special applications, despite the fact that it suffers from an environmental problem.

DISCLOSURE OF THE INVENTION

As a result of intense research in view of the above problems, the inventors have found that a large environmental pollution problem is not merely caused by using a flux containing zinc chloride, but also by carrying out the reaction soldering using a flux containing zinc chloride in an oxidizing atmosphere. That is, when the reaction soldering is carried out in the atmosphere using a flux containing zinc chloride, zinc, contained in the aluminum, the flux and deposited on the surface of the aluminum, is oxidized, leaving residues strongly adhered to the aluminum surface which cannot be easily removed by such means as water washing. Moreover, the Zn is not evenly deposited on the surface, providing a poor surface condition and the expected improvement of corrosion resistance may not be obtained. In addition, because of the oxidation of zinc deposited on the aluminum surface as mentioned above, a large amount of zinc chloride is required for forming a good Zn film layer on the surface. This means that to make up for Zn exhausted by oxidation, the correspondingly increased amount of zinc chloride should be used. Thus, as is apparent from the following reaction:

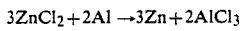

$$3ZnCl_2 + 2Al \rightarrow 3Zn + 2AlCl_3$$

a large amount of gaseous $AlCl_3$ is generated, deteriorating the working environment.

Based on the above finding, the inventors have found that the above problem can be solved by carrying out the reaction soldering using a flux containing zinc halide and Zn powder in an inert gas atmosphere so that the zinc halide contained in the flux may be reduced.

Experiments have been carried out, based on the above idea, involving the reaction soldering of an aluminum material using flux containing zinc halide and Zn powder, and have provided good results.

However, it has also been found that carrying out the reaction soldering simply in an inert gas atmosphere is not sufficient. That is, despite the above good results, further research has revealed that a gas generated by the reaction:

$$3ZnCl_2 + 2Al \rightarrow 3Zn + 2AlCl_3$$

remains on the surface of the aluminum material, preventing the problems from being completely solved.

From this finding, we have discovered that the above problems would be greatly alleviated if the reaction soldering of an aluminum material using a flux containing zinc halide and Zn powder is carried out not only in an inert gas atmosphere but also under an additional condition that the inert gas is flowing. Experiments based on this discovery have revealed that expected results would be obtained.

The inert gas may be a known non-oxidizing gas such as a nitrogen gas, an argon gas, etc., and the inert gas flow may be such that it can scatter a gas generated by the reaction soldering so that it may have a velocity of $1 \times 10^{-3}$ m/s or more.

Incidentally, with respect to the inert gas flow, if the flow velocity is too high, the formation of a fillet becomes unstable, so that it is desirably 1 m/s or less.

It has also been found that when the inert gas has a dew point of about $-10°$ C. or less, the oxidation of Zn is further suppressed, resulting in better surface conditions.

The flux containing zinc halide and Zn powder for use in the reaction soldering method according to the present invention may comprise 10 weight % or more (preferably about 10–50 weight %) of zinc halide such as zinc chloride, 60 weight % or less (preferably 10–60 weight %) of zinc powders, and if necessary 10 weight % or less of a fluoride such as $NH_4F$, NaF, etc. Solvents for this flux may be water, ketones, alcohols such as methanol, ethanol, propanol and butanol, aldehydes, nitriles, esters, lactones or ethers.

Furthermore, before performing the reaction soldering in an inert gas atmosphere, the abutted joints of aluminum fins attached to an aluminum tube are covered with the flux containing zinc halide and Zn powder, and dried. In this case, it has been found that in the course of drying the flux, the assembly of the aluminum fins and tube applied with the flux is moved in a position to enhance the formation of the fillet of zinc deposited by the reaction soldering.

That is, in the case of drying the flux applied to the abutments of the assembled aluminum members at temperatures of 100–300° C., when the aluminum member assembly is positioned properly about 30 seconds to 30 minutes after the initiation of drying, the fillet of zinc deposited by the reaction soldering is better formed at any place than otherwise, resulting in the decrease in unevenness of soldering strength and of heat exchange efficiency among the aluminum member.

Incidentally, the inert gas atmosphere in the reaction soldering according to the present invention and the inert gas atmosphere in the above mentioned inert gas atmosphere brazing are essentially different, because a main object of the present invention is to prevent the flux from becoming inactive due to the oxidation of Zn deposited as a joint metal, thereby reducing the amount of $ZnCl_2$ used.

BRIEF DESCRIPTION OF THE DRAWINGS

The figure is a schematic view of a heat exchanger according to one embodiment of the present invention.

EXAMPLES 1–20

The figure schematically shows a heat exchanger according to the present invention. In the figure, 1 denotes fins manufactured by casting an aluminum material having the composition as shown in Table 1 below into an ingot, homogenizing and trimming it, forming it into a 4-mm-thick plate by a hot strip mill, and further conducting a cold strip mill while performing intermediate annealing if necessary, to form a 0.13-mm-thick plate, slitting it if necessary and then corrugating the slitted plates.

2 denotes a flat tube having many holes prepared by a hot extrusion of aluminum materials having the composition as shown in Table 1.

The above fins 1 and the above extruded flat tube 2 are assembled as shown in the figure, and the resulting assembly 3 is dipped in a flux containing zinc halide and Zn powder which is prepared by dissolving each component in isopropyl alcohol so that $ZnCl_2$ is 30 weight %, zinc powder is 30 weight %, NaF is 2 weight % and $NH_4F$ is 1.5 weight %. Thus, the joints of the fins 1 and the extruded flat tube 2 are covered with the flux.

The assembly 3 in which the joints of the fins 1 and extruded flat tube 2 are covered with this flux is placed in a furnace at about 100–300° C. (for instance, 200° C.) in a manner as shown in the figure, and dried. While the flux has not been dried yet, retaining fluidity after the initiation of drying, the assembly 3 is moved in a position to enhance the formation of the flux, namely 30 seconds to thirty minutes after the initiation of drying. For instance, after 5 minutes, as shown by the arrows in the figure, the assembly is turned upside down and then the flux adhered to the assembly 3 is dried over the same period.

After the drying of the flux, the assembly 3 is placed in a furnace filled with an inert gas (Ar, dew point; $-10°$ C.), and the reaction soldering is carried out for 5 minutes by adjusting the furnace temperature at 430° C. After cooling, the heat exchanger constituted by the fins 1 and the extruded flat tube 2 and soldered by Zn deposited by the reaction soldering, is withdrawn from the furnace and washed with running water to remove the unreacted flux residue.

EXAMPLES 21–25

Examples 1, 3, 6, 7 and 10 are repeated except the inert gas atmosphere (Ar, dew point 5° C.) is used in the reaction soldering.

EXAMPLES 26–30

Examples 1, 3, 6, 7 and 10 are repeated except the inert gas is flowed at a speed of $5 \times 10^{-2}$ m/s in the inert gas atmosphere furnace during the reaction soldering. Incidentally, the flowing inert gas is circulated, and in the course of circulation, $AlCl_3$ generated by the reaction soldering is removed.

EXAMPLES 31–35

Examples 26–30 are repeated except for using an inert gas atmosphere ($N_2$, dew point; $-20°$ C.) is used as a furnace atmosphere in the reaction soldering, and setting the furnace temperature is set at 400° C.

Examples 36–40

Examples 1, 3, 6, 7 and 10 are repeated except a flux, containing 20 weight % of $ZnCl_2$, is used.

EXAMPLES 41–45

Examples 1, 3, 6, 7 and 10 are repeated except a flux containing 40 weight % of $ZnCl_2$, is used.

EXAMPLES 46-50

Examples 1, 3, 6, 7 and 10 are repeated except that the assembly's position remains the same during drying.

COMPARATIVE EXAMPLES 1-5

Examples 1, 3, 6, 7 and 10 are repeated except the reaction soldering is carried out in the atmosphere having a dew point of 5° C.

COMPARATIVE EXAMPLE 6-10

Comparative Examples 1-5 are repeated except a flux containing 50 weight % of $ZnCl_2$, is used.

COMPARATIVE EXAMPLE 11

Example 1 was repeated except a flux containing 60 weight % of $ZnCL_2$ without Zn powder, is used.

Properties

The heat exchangers obtained in the above Examples and Comparative Examples were evaluated with respect to the amount of toxic gas generated in the reaction soldering, the amount of residue adhered to the surface by the reaction soldering, easiness of removal of this residue, surface roughness, surface gloss, solderability (throat thickness) between the extruded flat tube and the fins, the thickness and evenness of a Zn film deposited on the surface, corrosion resistance (determined based on the pitting of the extruded flat tube and the corrosion of the fillet by a 720-hour CASS test), and mechanical strength (tensile strength and 0.2% proof strength) after the annealing of the fins. The results are shown in Table 2.

As is apparent from Table 2 which shows the comparison of Examples with Comparative Examples 1-5 and Comparative Examples 6-10, the reaction soldering using zinc halide in the atmosphere cannot be conducted on the aluminum member without using a large amount of a zinc halide as in Comparative Examples 6-10. Therefore the aluminum member cannot be soldered by the reaction soldering of Comparative Examples 1-5. And even though the amount of zinc halide is increased as in Comparative Examples 6-10 to enable the soldering of the aluminum member, good solderability is not obtained. In addition, the Zn film deposited on the surface is not so thick, suffering from extreme unevenness in thickness, so that it does not have a good corrosion resistance and has a rough surface with low gloss and appearance. Furthermore, it is difficult to remove the residue and a large amount of toxic gas is generated by the reaction soldering, lowering the job conditions.

On the other hand, in a case where the reaction soldering using zinc halide and Zn powder is carried out in an inert gas atmosphere, the aluminum member is well soldered even with a small amount of zinc halide, providing a thick and uniform Zn film deposited on the surface. Thus, the aluminum member has excellent solderability and corrosion resistance and less surface roughness. Furthermore, the aluminum member has good surface gloss and appearance. In addition, the residue is less likely to adhere to the surface, is easily removed, and only a small amount of toxic gas is generated by the reaction soldering.

Furthermore, not only by conducting the reaction soldering in an inert gas atmosphere, but also flowing the inert gas, causes the improvement of the solderability and the thickness and evenness of the deposited Zn film, reducing a surface roughness and improving a surface gloss and appearance. The amount of residue adhered to the surface is further decreased, because the flowing inert gas is facilitated to remove the residue. In addition, depending on whether or not the position of assembly 3 is changed to enhance the formation of the fillet of zinc in the drying step before conducting the reaction soldering of flux applied to the joints of the fins and the extruded flat tube, the throat thickness of the fillet may differ between an upper position 1a and a lower position 1b of the fin. Namely, when the position of assembly 3 is changed during the drying, the upper position 1a of the fin and the lower position 1b of the fin have a fillet of substantially the same throat thickness, and the throat thickness itself is large. On the other hand, when the position of assembly 3 is not changed during the drying, the fillet has a small throat thickness at the upper position 1 a of the fin, and the soldering is not necessarily good all over the surface.

Accordingly, in the case of assembling a heat exchanger, it is desirable to turn it in a position so as to enhance the formation of the fillet of zinc deposited by the reaction soldering during the drying of the flux.

Further, when the extruded flat tube having many holes is made of an aluminum alloy containing 0.1-3 weight % of Zn, or when the fin is made of an aluminum alloy containing 0.3-6.5 weight % of Zn, better corrosion resistance is obtained for the extruded flat tubes and for the joints of the extruded flat tubes and the fins. This results in a lesser likelihood of corrosion of the extruded flat tube which leads to the formation of holes and reducing the exhaustion of Zn deposited on the joints. The result also improves durability of the joints of the extruded flat tube and the fins.

In addition, because the fins are made of an aluminum alloy containing 0.3-6.5 weight % of Zn and 0.1-2.2 weight % of Mg instead of the aluminum alloy containing 0.3-6.5 weight % of Zn, the fins have a good mechanical strength after annealing. This result is desirable because the fins will then be highly resistant to deformation by a wind pressure.

What is claimed is:

1. A heat exchanger composed of an aluminum tube and aluminum fins abutted to said tube, the joints of said tube and said fins having been soldered by zinc deposited by a reaction soldering using a flux containing 10-50 weight % of zinc halide and 10-60 weight % of Zn powder in an inert gas atmosphere.

2. The heat exchanger according to claim 1, wherein said zinc halide employed was $ZnCl_2$.

3. The heat exchanger according to claim 1, wherein said tube was made of an aluminum alloy containing 0.1-3 weight % of Zn.

4. The heat exchanger according to claim 1, wherein said fins were made of an aluminum alloy containing 0.3-6.5 weight % of Zn.

5. The heat exchanger according to claim 1, wherein said fins were made of an aluminum alloy containing 0.3-6.5 weight % of Zn and 0.1-2.2 weight % of Mg.

6. The heat exchanger according to claim 1, wherein in the course of drying of said flux containing zinc halide and Zn powder applied to the joints of said tube and said fins, said heat exchanger applied with said flux is moved in a position to enhance the formation of zinc deposited by the reaction soldering.

7. The heat exchanger according to claim 1, wherein said heat exchanger is positioned according to claim 24

30 seconds to 30 minutes after the initiation of drying of said flux at a temperature of from about 100 to 300° C.

8. The heat exchanger according to claim 1, wherein said inert gas was one with a dew point of −10° C. or less.

9. The heat exchanger according to claim 8, wherein said inert gas was Ar.

10. The heat exchanger according to claim 8, or wherein said inert gas was $N_2$.

11. The heat exchanger according to claim 8, or wherein said inert gas was flowing.

12. The heat exchanger according to claim 11, wherein said inert gas was flowing at a speed of $1 \times 10^{-3} - 1$ m/s in the vicinity of said flux applied to said joints.

13. The heat exchanger according to claim 1, wherein said inert gas was flowing at a speed of $1 \times 10^{-3} - 1$ m/s in the vicinity of said flux applied to said joints.

14. The heat exchanger according to claim 1, wherein said inert gas was Ar.

15. The heat exchanger according to claim 1, wherein said inert gas was $N_2$.

16. The heat exchanger according to claim 1, wherein said inert gas was flowing.

17. The heat exchanger according to claim 16, wherein said inert gas was flowing at a speed of $1 \times 10^{-3} - 1$ m/s in the vicinity of said flux applied to joints.

* * * * *